(12) United States Patent
Gotou et al.

(10) Patent No.: US 9,157,519 B2
(45) Date of Patent: Oct. 13, 2015

(54) WORM REDUCTION GEAR

(75) Inventors: Takashi Gotou, Konan (JP); Hiroki Masuda, Kani (JP)

(73) Assignee: KAYABA INDUSTRY CO., LTD., Tokyo (JP)

(*) Notice: Subject to any disclaimer, the term of this patent is extended or adjusted under 35 U.S.C. 154(b) by 470 days.

(21) Appl. No.: 13/369,345

(22) Filed: Feb. 9, 2012

(65) Prior Publication Data
US 2012/0204666 A1 Aug. 16, 2012

(30) Foreign Application Priority Data

Feb. 16, 2011 (JP) ................................ 2011-030936

(51) Int. Cl.
*F16H 57/039* (2012.01)
*F16H 57/031* (2012.01)
*F16H 57/04* (2010.01)
*F16H 1/16* (2006.01)
*F16H 57/02* (2012.01)

(52) U.S. Cl.
CPC ............ *F16H 57/031* (2013.01); *F16H 57/039* (2013.01); *F16H 57/0464* (2013.01); *F16H 57/0498* (2013.01); *F16H 1/16* (2013.01); *F16H 2057/02082* (2013.01); *Y10T 74/19828* (2015.01)

(58) Field of Classification Search
CPC ............................. F16H 57/039; F16H 57/0498
USPC .......... 184/72, 55.2, 6.12, 55.1, 58, 443, 444; 74/424, 458, 500, 587, 605, 606 R, 467, 74/58, 606 A, 87, 89.41
See application file for complete search history.

(56) References Cited

U.S. PATENT DOCUMENTS

| 3,650,353 | A | * | 3/1972 | Abbott | 184/6.12 |
| 3,785,458 | A | * | 1/1974 | Caldwell et al. | 184/6.12 |
| 3,789,956 | A | * | 2/1974 | Neugebauer | 184/6.12 |
| 5,161,431 | A | | 11/1992 | Watanabe | |
| 5,957,000 | A | * | 9/1999 | Pecorari | 74/425 |
| 5,992,259 | A | * | 11/1999 | Fleytman | 74/425 |
| 6,454,043 | B2 | * | 9/2002 | Fujita et al. | 180/444 |
| 7,066,046 | B1 | * | 6/2006 | Gibson | 74/425 |

(Continued)

FOREIGN PATENT DOCUMENTS

| EP | 1 810 911 A2 | 7/2007 |
| JP | 200095122 A | 4/2000 |
| JP | 200569476 A | 3/2005 |

(Continued)

OTHER PUBLICATIONS

An EP Search Report dated Jun. 13, 2012 issued in EP Application No. 12155681.5.
Office Action mailed Feb. 18, 2014, corresponds to Japanese patent application No. 2011-030936.

*Primary Examiner* — William C Joyce
*Assistant Examiner* — Thomas Magnuson
(74) *Attorney, Agent, or Firm* — Hauptman Ham, LLP

(57) ABSTRACT

A worm reduction gear that reduces a rotation of a worm and transmits the reduced rotation to a worm wheel includes a casing that houses the worm and the worm wheel, wherein the casing includes: a wheel opposing surface that opposes an end surface of the worm wheel via an interval; and a grease holding recessed portion formed in a recessed shape in the wheel opposing surface, and the grease holding recessed portion is provided in a position opposing a worm meshing portion between the worm and the worm wheel.

7 Claims, 6 Drawing Sheets

(56) References Cited

U.S. PATENT DOCUMENTS

| | | |
|---|---|---|
| 2001/0032752 A1 | 10/2001 | Fujita et al. |
| 2006/0232234 A1* | 10/2006 | Newman, Jr. ............... 318/280 |
| 2008/0168854 A1* | 7/2008 | Iwano ..................... 74/388 PS |
| 2011/0247440 A1* | 10/2011 | Warke ........................... 74/405 |

FOREIGN PATENT DOCUMENTS

| | | |
|---|---|---|
| JP | 2006-76443 A | 3/2006 |
| JP | 2007196751 A | 8/2007 |
| JP | 2008-22651 A | 1/2008 |
| JP | 2009130980 A | 6/2009 |

* cited by examiner

WORM REDUCTION GEAR

TECHNICAL FIELD OF THE INVENTION

This invention relates to a worm reduction gear that reduces rotation of a worm and transmits the reduced rotation to a worm wheel.

BACKGROUND OF THE INVENTION

JP2009-130980A discloses a conventional worm reduction gear in which grease in charged into a casing housing a worm and a worm wheel, and a worm meshing portion between the worm and the worm wheel is lubricated by the grease.

SUMMARY OF THE INVENTION

In a conventional worm reduction gear such as that disclosed in JP2009-130980A, however, the grease disperses through the casing, and it is therefore difficult to keep the worm meshing portion lubricated with a small amount of grease.

When the amount of charged grease is increased as a countermeasure, the worm meshing portion can be kept lubricated, but the increase in the amount of used grease leads to an increase in product cost.

This invention has been designed in consideration of the problem described above, and an object thereof is to provide a worm reduction gear in which a worm meshing portion can be kept lubricated using a small amount of grease.

This invention provides a worm reduction gear that reduces a rotation of a worm and transmits the reduced rotation to a worm wheel. The worm reduction gear includes a casing that houses the worm and the worm wheel, wherein the casing comprises: a wheel opposing surface that opposes an end surface of the worm wheel via an interval; and a grease holding recessed portion formed in a recessed shape in the wheel opposing surface, and the grease holding recessed portion is provided in a position opposing a worm meshing portion between the worm and the worm wheel.

PREFERRED EMBODIMENT OF THE INVENTION

An embodiment of this invention will be described below on the basis of the attached figures.

Referring to FIGS. 1 to 6, a worm reduction gear 2 according to an embodiment of this invention will be described.

The worm reduction gear 2 is provided in an electric power steering device 1 in order to transmit rotation of an electric motor 3 to a steering mechanism (not shown) of a vehicle as a steering assist force.

Figure 2:
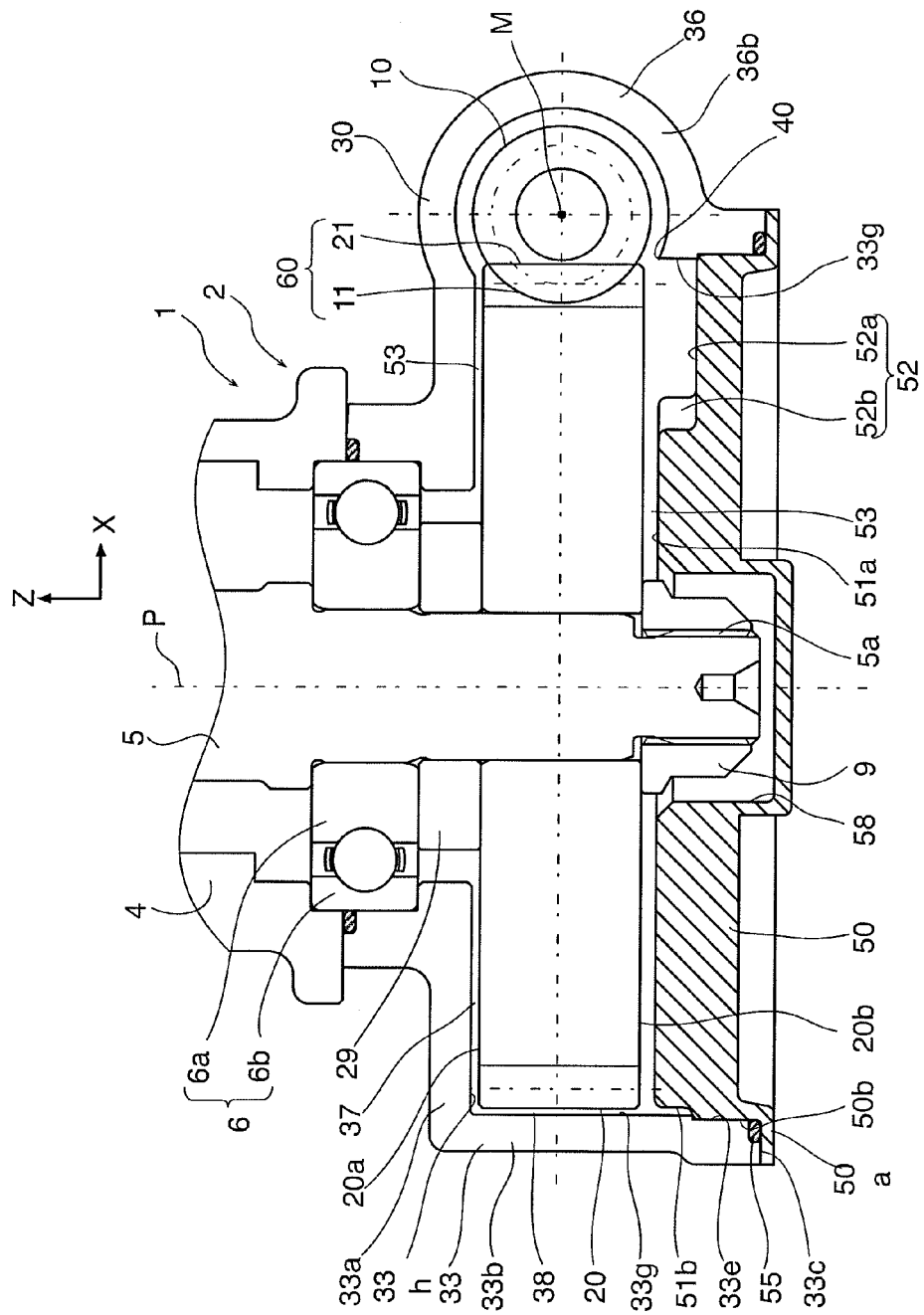
FIG. 2 is a longitudinal sectional view of the worm reduction gear.
Figure 3:
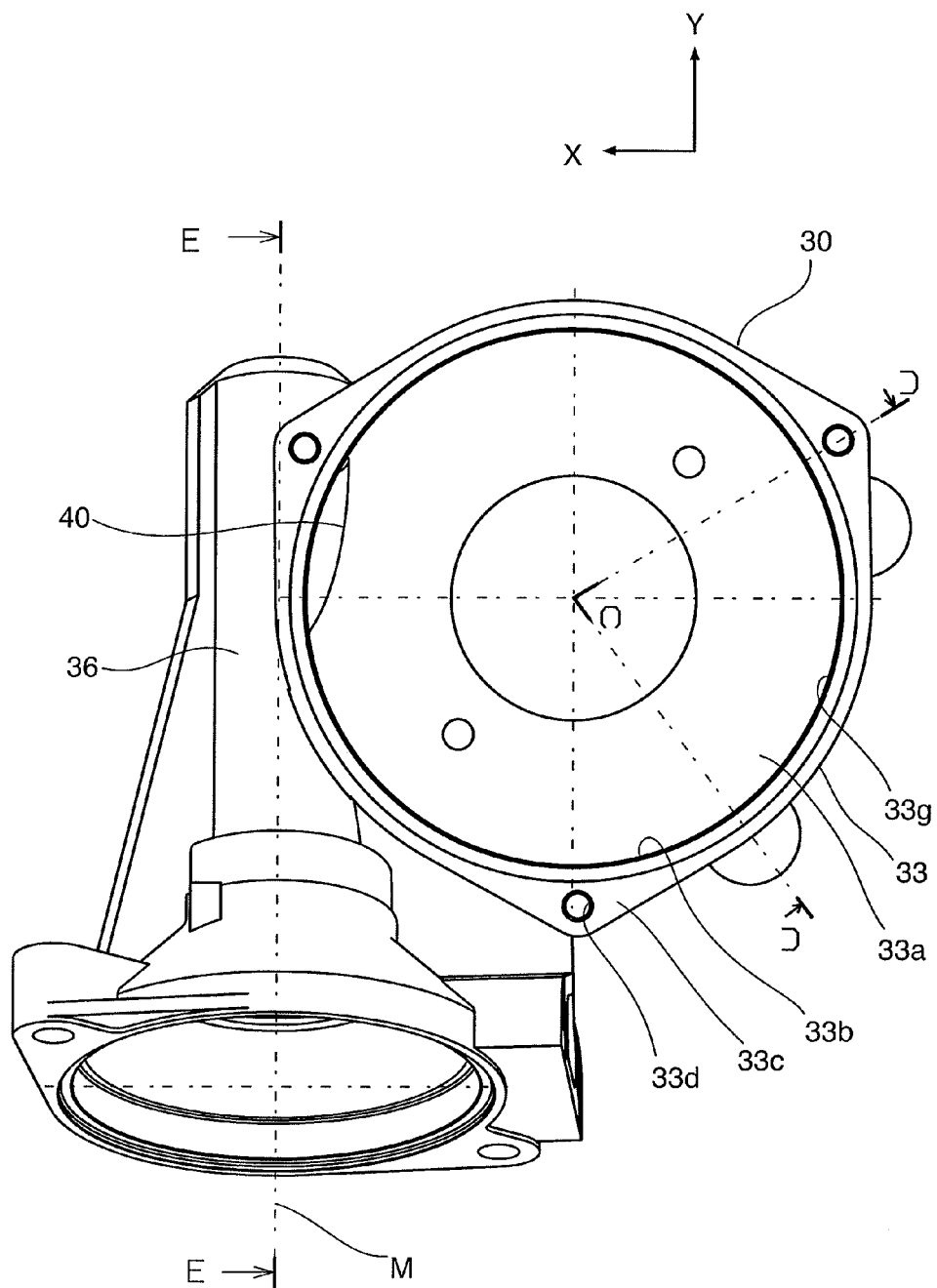
FIG. 3 is a plan view showing a gear housing provided in the worm reduction gear from below.

In FIG. 2, a steering output shaft 5 is supported in a steering housing 4 of the electric power steering device 1 to be capable of rotating via a bearing 6.

Steering torque generated by a steering wheel operation performed by a driver is input into the steering output shaft 5, and the steering assist force from the electric motor 3 is input into the steering output shaft 5 via the worm reduction gear 2. When the steering output shaft 5 rotates, a rack shaft (not shown) that meshes with a pinion (not shown) provided in an intermediate location of the steering output shaft 5 moves, whereby a vehicle wheel is steered via a tie rod (not shown) or the like connected to a crankshaft.

A configuration of the worm reduction gear 2 will now be described. Here, three axes, namely X, Y, and Z axes, are set to be mutually orthogonal such that the X axis extends in a substantially horizontal front-rear direction, the Y axis extends in a substantially horizontal lateral direction, and the Z axis extends in an up-down direction (a substantially vertical direction).

The worm reduction gear 2 includes a worm 10 that is driven to rotate by the electric motor 3, and a worm wheel 20 that meshes with the worm 10. The worm reduction gear 2 reduces rotation of the worm 10 and transmits the reduced rotation to the worm wheel 20.

The worm 10 rotates axially. The worm 10 takes a columnar shape, and a helical worm tooth portion 11 is provided on an outer periphery thereof.

The worm 10 includes a base end portion 12 to which a motor shaft 3a of the electric motor 3 is coupled, a base end shaft portion 13 supported rotatably via a bearing 7, and a tip end shaft portion 14 supported rotatably via a bearing 8.

The worm wheel 20 rotates axially. The worm wheel 20 takes a disc shape, and a wheel tooth portion 21 is provided on an outer periphery thereof.

The worm wheel 20 is coupled to a tip end portion (a lower end portion) of the steering output shaft 5. An inner race 6a of the bearing 6, an annular spacer 29, and the worm wheel 20 are fitted to the steering output shaft 5 in that order, and the steering output shaft 5 is fastened via a nut 9 screwed to a screw portion 5a thereof.

Figure 4:
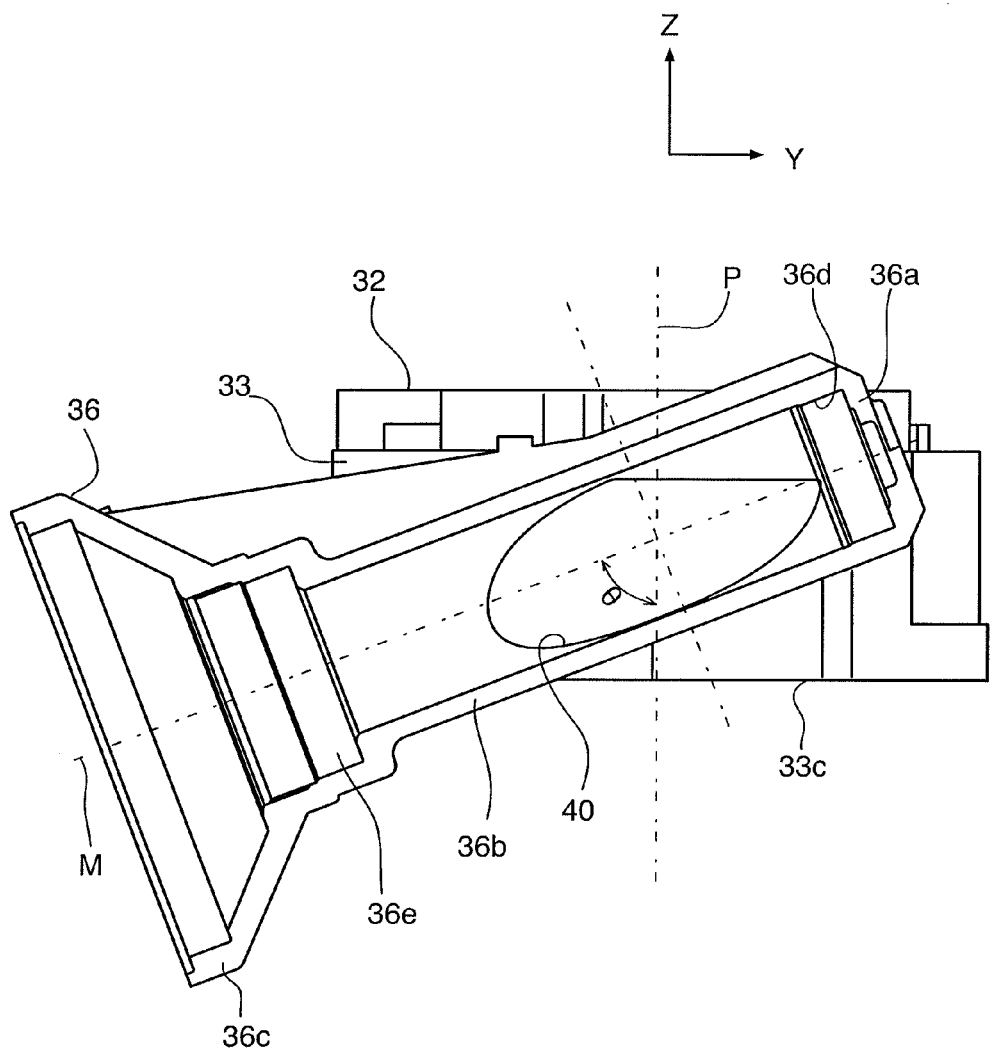
FIG. 4 is a sectional view of the gear housing along an E-E line in FIG. 3.

As shown in FIG. 4, a central axis P of the worm wheel 20 extends along the Z axis in the up-down direction (a substantially vertical direction).

A central axis M of the worm 10 is inclined relative to the central axis P of the worm wheel 20 by an incline angle θ. As a result, the electric motor 3 is disposed to project diagonally downward from the worm reduction gear 2.

It should be noted that the electric motor 3 is not limited to this arrangement, and instead, the central axis M of the worm 10 may extend in the Y axis direction (a substantially horizontal direction) so as to be substantially orthogonal to the central axis P of the worm wheel 20 such that the electric motor 3 is disposed to project in a lateral direction from the worm reduction gear 2.

As shown in FIG. 2, the worm reduction gear 2 includes a gear housing that is incorporated into a steering housing 4 as a casing that houses the worm 10 and the worm wheel 20, and a lower cover 50 encapsulating the gear housing 30. The gear housing 30 is incorporated into a lower end portion of the steering housing 4.

Figure 5:
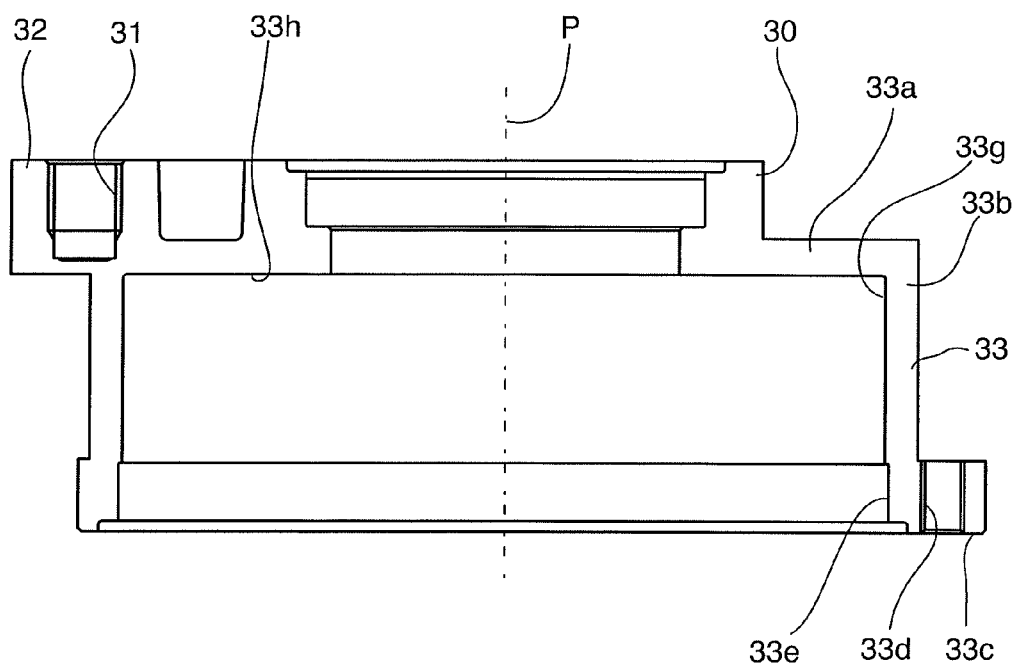
FIG. 5 is a sectional view of the gear housing along a D-O-D line in FIG. 3.

As shown in FIG. 5, an attachment seat 32 contacting a lower end of the steering housing 4, and four screw holes 31 opening onto the attachment seat 32 are formed in an upper portion of the gear housing 30. The gear housing 30 is fastened to the steering housing 4 via bolts (not shown) screwed into the respective screw holes 31.

As shown in FIG. 2, an outer race 6b of the bearing 6 is interposed between the steering housing 4 and the gear housing 30.

The gear housing 30 includes a tubular worm housing portion 36 that houses the worm 10.

Figure 1:
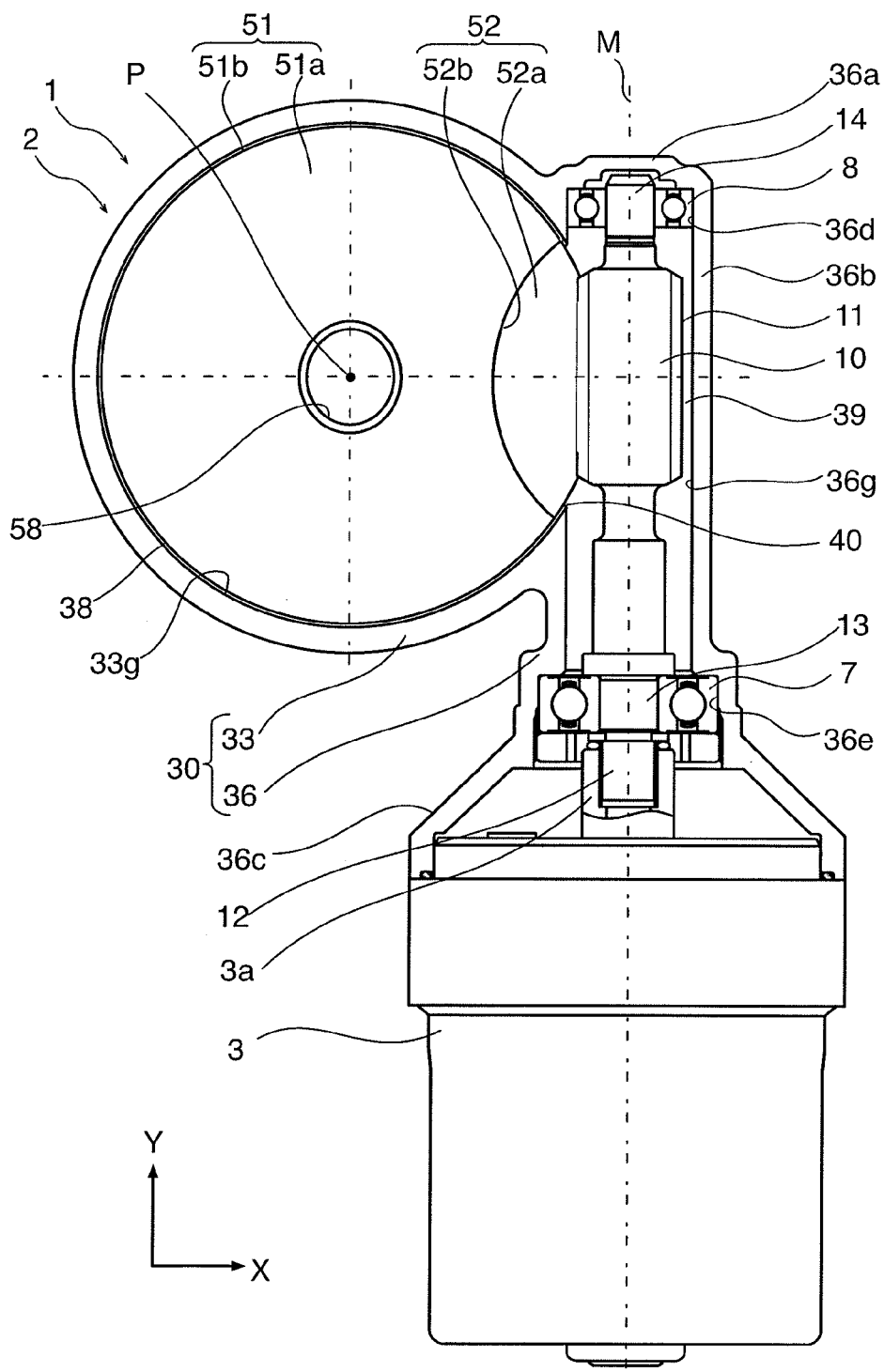
FIG. 1 is a sectional view of a worm reduction gear according to an embodiment of this invention.

As shown in FIGS. 1 and 4, the worm housing portion 36 includes a bottom wall portion 36a opposing a tip end of the worm 10, a worm surrounding wall portion 36b surrounding the worm tooth portion 11, and an open wall portion 36c into which the electric motor 3 is incorporated.

The bearing 8 is interposed in a spigot portion 36d formed in a back portion of the worm surrounding wall portion 36b, and the bearing 7 is interposed in a spigot portion 36e formed in an open end portion of the worm surrounding wall portion 36b.

The worm surrounding wall portion 36b includes a cylindrical worm surrounding wall surface 36g centering on the central axis M of the worm 10. The worm surrounding wall surface 36g opposes the worm tooth portion 11 via an interval 39.

The gear housing 30 includes a tubular wheel housing portion 33 that houses the worm wheel 20.

As shown in FIGS. 2 and 5, the wheel housing portion 33 includes a ceiling wall portion 33a that opposes an end surface 20a of the worm wheel 20, a wheel surrounding wall portion 33b surrounding the worm wheel 20, and an attachment seat 33c for the lower cover 50.

The ceiling wall portion 33a includes a planar wheel opposing surface 33h that is orthogonal to the central axis P. The wheel opposing surface 33h opposes the end surface 20a of the worm wheel 20 in parallel thereto. An interval 37 is defined between the wheel opposing surface 33h and the end surface 20a of the worm wheel 20.

The wheel surrounding wall portion 33b includes a wheel surrounding wall surface 33g having a cylindrical surface shape centering on the central axis P. The wheel surrounding wall surface 33g opposes the wheel tooth portion 21 via an interval 38.

The wheel surrounding wall portion 33b and the worm surrounding wall portion 36b are joined integrally such that a communicating window 40 is opened therebetween. A worm meshing portion 60 between the worm 10 and the worm wheel 20 is disposed in the communicating window 40.

A spigot portion 33e is for mired in an open end portion of the wheel surrounding wall portion 33b, and the lower cover 50 is fitted to the spigot portion 33e so as to be incorporated therein.

Three screw holes 33d opening onto the attachment seat 33c are formed in the wheel housing portion 33. The lower cover 50 is fastened to the gear housing 30 via bolts (not shown) screwed into the respective screw holes 33d. As a result, the lower cover 50 is incorporated into the gear housing 30.

Figure 6:
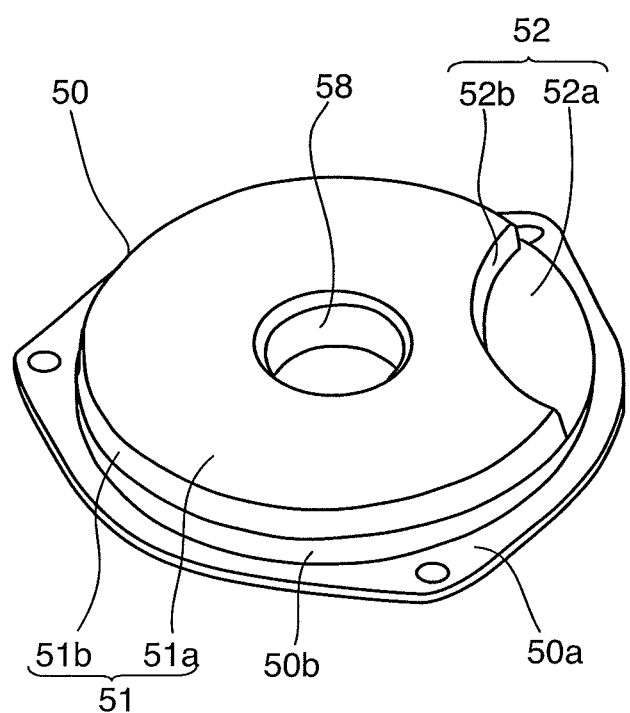
FIG. 6 is a perspective view of a lower cover provided in the worm reduction gear.

As shown in FIGS. 2 and 6, the disc-shaped lower cover 50 includes a flange portion 50a that contacts the attachment seat 33c, and an outer peripheral surface 50b fitted to the spigot portion 33e. The flange portion 50a of the lower cover 50 is fastened to the gear housing 30 via a bolt, not shown in the figures. A sealing material 55 is interposed between the flange portion 50a and the attachment seat 33c to form an airtight seal.

The lower cover 50 includes a disc-shaped wheel opposing base portion 51 that opposes an end surface 20b of the worm wheel 20, and a grease holding recessed portion 52 formed in a recessed shape in a side portion of the wheel opposing base portion 51.

The wheel opposing base portion 51 includes a planar wheel opposing surface 51a that is orthogonal to the central axis P of the worm wheel 20, and a wheel opposing base portion side face 51b that extends in a cylindrical shape centering on the central. axis P.

The wheel opposing surface 51a opposes the end surface 20b of the worm in wheel 20 in parallel thereto. An interval 53 is defined between the wheel opposing surface 51a and the end surface 20b of the worm wheel 20. A dimension of the interval 53 is set to be as small as possible within a range where the wheel opposing surface 51a does not interfere with the end surface 20b of the worm wheel 20.

The grease holding recessed portion 52 is formed in a recessed shape in the wheel opposing surface 51a. The grease holding recessed portion 52 includes a planar recessed portion bottom surface 52a that is orthogonal to the central axis P, and a recessed portion side face 52b that extends from the recessed portion bottom surface 52a to the wheel opposing surface 51a.

The recessed portion bottom surface 52a is disposed below the worm meshing portion 60 so as to face the worm meshing portion 60.

The recessed portion side face 52b is formed as a curved surface that curves in a recessed shape around the worm meshing portion 60. As shown in FIG. 1, the recessed portion side face 52b is formed as a recessed curved surface having an arc-shaped cross-section so as to oppose the wheel surrounding wall surface 33g and surround the worm meshing portion 60.

As shown in FIG. 1, the gear housing 30 is formed such that an angular formation range of the grease holding recessed portion 52 includes an angular formation range of the communicating window 40 in a circumferential direction with respect to the central axis P. In this embodiment, the gear housing 30 is formed such that the angular for formation range of the grease holding recessed portion 52 and the angular formation range of the communicating window 40 in a circumferential direction with respect to the central axis P are substantially equal.

A space having a predetermined volume is defined between the grease holding recessed portion 52 of the lower cover 50 and the wheel surrounding wall surface 33g of the gear housing 30 surrounding the worm wheel 20. Grease is stored in this space as a lubricant for lubricating the worm meshing portion 60.

When the worm reduction gear 2 is assembled, the worm wheel 20 coated with grease around an entire periphery of the wheel tooth portion 21 is incorporated into the gear housing 30 such that a predetermined amount of grease is charged into the casing.

The lower cover 50 includes a nut housing recessed portion 58 formed as a recess in a central portion of the wheel opposing base portion 51. A tip end portion of the steering output shaft 5 and a nut 9 that is screwed thereto are housed in the nut housing recessed portion 58.

Actions of the worm reduction gear 2 will now be described.

In the worm reduction gear 2, the worm 10 is driven to rotate by the electric motor 3 such that the worm tooth portion 11 of the worm 10 and the wheel tooth portion 21 of the worm wheel 20 mesh with each other in the worm meshing portion 60. As a result, the rotation of the worm 10 is reduced and transmitted to the worm wheel 20.

As a result of a rotary reciprocating motion of the worm wheel 20, the grease adhered to the periphery of the worm wheel 20 is dammed by the recessed portion side face 52b so as to gather in the grease holding recessed portion 52.

As shown in FIG. 4, the worm meshing portion 60 is structured such that the helical worm tooth portion 11 meshes with the spur-shaped wheel tooth portion 21, and therefore the worm meshing portion 60 exhibits a pump function for pumping the grease. When the worm 10 rotates in one direction, the grease held in the grease holding recessed portion 52 is suctioned into the worm meshing portion 60, and when the worm 10 rotates in another direction, the grease is discharged from the worm meshing portion 60 and returned to the grease holding recessed portion 52.

By providing the incline angle θ between the rotary central axis P of the worm tooth portion 11 and the rotary central axis M of the wheel tooth portion 21, an opening portion of the meshing portion between the worm tooth portion 11 facing the grease holding recessed portion 52 and the wheel tooth portion 21 increases. As a result, the grease can be suctioned into the meshing portion more easily.

By switching the rotation direction of the worm 10 in this manner, the grease circulates between the worm meshing portion 60 and the grease holding recessed portion 52. Accordingly, the worm meshing portion 60 is lubricated by the grease such that the worm tooth portion 11 and the wheel tooth portion 21 slide against each other smoothly. As a result, rattling noise from the worm meshing portion 60 can be suppressed.

Further, in a conventional device not including the grease holding recessed portion, rattling noise from the worm meshing portion is suppressed by increasing the amount of grease charged into the casing. When the grease is charged into the casing in this case, however, a viscous resistance of the grease acting on the worm and the worm wheel increases, and as a result, a steering feeling deteriorates during a return operation of the steering wheel and so on. To eliminate this deterioration of the steering feeling, a control circuit that applies steering assist force during a return operation of the steering wheel is required, leading to an increase in product cost.

A summary of this embodiment will now be described together with actions and effects thereof.

This embodiment provides the worm reduction gear 2 which includes the worm 10 that rotates about the axis M, the worm wheel 20 that is driven to rotate about the axis P by being meshed to the worm 10, and the casing housing the worm 10 and the worm wheel 20, and which reduces a rotation of the worm 10 and transmits the reduced rotation to the worm wheel 20, wherein the casing includes the wheel opposing surface 51a opposing the end surface 20b of the worm wheel 20 via the interval 53, and the grease holding recessed portion 52 formed in a recessed shape in the wheel opposing surface 51a. The grease holding recessed portion 52 is provided in a position opposing the worm meshing portion 60 between the worm 10 and the worm wheel 20.

According to this configuration, the grease is held in the grease holding recessed portion 52, and the grease circulates between the grease holding recessed portion 52 and the worm meshing portion 60. Therefore, the amount of grease charged into the casing can be reduced while keeping the worm meshing portion 60 lubricated. By reducing the amount of grease charged into the casing, the viscous resistance of the grease acting on the worm 10 and the worm wheel 20 can be reduced, and therefore deterioration of the steering feeling can be avoided.

In this embodiment, the grease holding recessed portion 52 includes the recessed portion bottom surface 52a opposing the end surface 20b of the worm wheel 20, and the recessed portion side face 52b extending from the recessed portion bottom surface 52a to the wheel opposing surface 51a. Further, the recessed portion bottom surface 52a is disposed below the worm meshing portion 60, and the recessed portion side face 52b is formed as a recessed curved surface.

According to this configuration, a space foiled in a recessed shape is defined by the grease holding recessed portion 52 positioned below the worm meshing portion 60, the grease held in the grease holding recessed portion 52 by gravitational force, and therefore the grease circulates between the grease holding recessed portion 52 and the worm meshing portion 60. As a result, the worm meshing portion 60 can be kept lubricated even by the small amount of grease charged into the casing.

The grease held in the grease holding recessed portion 52 circulates around the recessed portion side face 52b formed as a recessed curved surface, and is then suctioned back into the worm meshing portion 60.

In this embodiment, the recessed portion side face 52b is formed as a curved surface that curves in a recessed shape around the worm meshing portion 60. It should be noted, however, that the recessed portion side face 52b is not limited to this shape, and respective end portions of the recessed portion side face 52b may be formed in a planar shape, for example.

In this embodiment, the casing includes the gear housing 30 housing the worm wheel 20 and the lower cover 50 encapsulating the gear housing 30. The lower cover 50 includes the disc-shaped wheel opposing base portion 51 opposing the end surface 20b of the worm wheel 20, the grease holding recessed portion 52 is formed as a recess in a side portion of the wheel opposing base portion 51, and the recessed portion side face 52b is formed as a recessed curved surface that curves around the worm meshing portion 60.

According to this configuration, an internal volume of the casing is reduced by the wheel opposing base portion 51 including the wheel opposing surface 51a that opposes the end surface 20b of the worm wheel 20. Accordingly, the grease gathers in the grease holding recessed portion 52 formed in a recessed shape in the side portion of the wheel opposing base portion 51, and therefore the meshing portion 60 can be kept lubricated using a small amount of grease.

Embodiments of this invention were described above, but the above embodiments are merely examples of applications of this invention, and the technical scope of this invention is not limited to the specific constitutions of the above embodiments.

This application claims priority based on Japanese Patent Application No. 2011-030936 filed with the Japan Patent Office on Feb. 16, 2011, the entire contents of which are incorporated into this specification.

What is claimed is:

1. A worm reduction gear configured to reduce a rotation of a worm and transmit the reduced rotation to a worm wheel, the worm reduction gear comprising:
 a worm configured to rotate axially,
 a worm wheel configured to be driven to rotate by being meshed with the worm,
 a casing that houses the worm and the worm wheel,
 wherein the casing comprises:
 a wheel opposing surface that opposes an end surface of the worm wheel via an interval; and
 a grease holding recessed portion formed in a recessed shape in the wheel opposing surface and facing a worm meshing portion between the worm and the worm wheel, and
 wherein the grease holding recessed portion comprises:
 a recessed portion bottom surface opposing the end surface of the worm wheel; and a recessed portion side face extending from the recessed portion bottom surface to the wheel opposing surface, wherein the recessed portion side face is formed in an arc shape which opens towards the worm meshing portion, and wherein the casing comprises:

a gear housing that houses the worm wheel; and a lower cover encapsulating the gear housing, the lower cover includes a disc-shaped wheel opposing base portion including the wheel opposing surface that opposes the end surface of the worm wheel, the grease holding recessed portion is formed in a recessed shape in a side portion of the wheel opposing base portion, and the recessed portion side face is formed around the worm meshing portion.

2. A worm reduction gear configured to reduce a rotation of a worm and transmit the reduced rotation to a worm wheel, the worm reduction gear comprising:

a worm configured to rotate axially, a worm wheel configured to be driven to rotate by being meshed with the worm, a casing that houses the worm and the worm wheel, wherein the casing comprises:

a wheel opposing surface that opposes an end surface of the worm wheel via an interval; and a grease holding recessed portion formed in a recessed shape in the wheel opposing surface and facing a worm meshing portion between the worm and the worm wheel, wherein the grease holding recessed portion comprises:

a recessed portion bottom surface opposing the end surface of the worm wheel; and a recessed portion side face extending from the recessed portion bottom surface to the wheel opposing surface, wherein the recessed portion side face is formed as a recessed curved surface having an arc-shaped cross-section so as to surround the worm meshing portion, and wherein, when seen along a central axis of the worm wheel, a center of the arc-shaped cross-section and the central axis of the worm wheel are located on opposite sides of the worm meshing portion.

3. The worm reduction gear as defined in claim 2, wherein the recessed portion side face is formed as the recessed curved surface having the arc-shaped cross-section so as to oppose a wheel surrounding wall surface that surrounds the worm wheel.

4. The worm reduction gear as defined in claim 1, wherein the grease holding recessed portion is only formed at a position facing the worm meshing portion.

5. The worm reduction gear as defined in claim 2, wherein the casing comprises:

a gear housing that houses the worm wheel; and a lower cover encapsulating the gear housing, the lower cover includes a disc-shaped wheel opposing base portion including the wheel opposing surface that opposes the end surface of the worm wheel, the grease holding recessed portion is formed in the recessed shape in a side portion of the wheel opposing base portion, and the recessed portion side face is formed around the worm meshing portion.

6. The worm reduction gear as defined in claim 1, wherein the worm meshing portion is structured that a helical worm tooth portion meshes with a spur-shaped wheel tooth portion.

7. The worm reduction gear as defined in claim 2, wherein, when seen along the central axis of the worm wheel, the center of the arc-shaped cross-section is located below a straight line connecting a center of the worm meshing portion and the central axis of the worm wheel.

* * * * *